United States Patent
Adams et al.

(10) Patent No.: US 9,348,198 B1
(45) Date of Patent: May 24, 2016

(54) MIRRORED PHOTOGRAPHING SYSTEM

(71) Applicants: Leonard Adams, Long Island City, NY (US); Thomas L. Brisbane, Saint Albans, NY (US)

(72) Inventors: Leonard Adams, Long Island City, NY (US); Thomas L. Brisbane, Saint Albans, NY (US)

( * ) Notice: Subject to any disclaimer, the term of this patent is extended or adjusted under 35 U.S.C. 154(b) by 0 days.

(21) Appl. No.: 14/851,289

(22) Filed: Sep. 11, 2015

Related U.S. Application Data

(60) Provisional application No. 62/118,297, filed on Feb. 19, 2015.

(51) Int. Cl.
*G03B 17/56* (2006.01)

(52) U.S. Cl.
CPC .................................. *G03B 17/565* (2013.01)

(58) Field of Classification Search
CPC ............................ G03B 17/561; G03B 17/565
See application file for complete search history.

(56) References Cited

U.S. PATENT DOCUMENTS

| | | | | |
|---|---|---|---|---|
| 1,099,820 A * | 6/1914 | Ridings | ................... | G03B 17/53 359/871 |
| 3,540,364 A * | 11/1970 | Ono | ....................... | G03B 19/12 396/268 |
| 4,490,029 A * | 12/1984 | Tanaka | ..................... | G03B 9/64 396/317 |
| 4,771,300 A * | 9/1988 | Bryan | .................... | G03B 15/06 359/839 |
| 4,999,657 A * | 3/1991 | Leuer | ..................... | G03B 17/53 396/376 |
| 5,537,175 A * | 7/1996 | Kamaya | ................. | G03B 11/06 348/E5.025 |
| 5,940,229 A * | 8/1999 | Baumgarten | .......... | H04N 7/142 348/14.16 |
| 6,011,518 A * | 1/2000 | Yamagishi | ........... | H01Q 1/3266 343/700 MS |
| 7,706,673 B1 * | 4/2010 | Staudinger | ............. | F16M 11/06 348/211.2 |
| 8,702,254 B1 * | 4/2014 | Englander | ................ | B60R 1/08 359/872 |
| 9,170,473 B1 * | 10/2015 | Li | ........................ | G03B 17/561 |
| 2013/0016960 A1 * | 1/2013 | Yang | ..................... | G03B 17/08 396/25 |

* cited by examiner

Primary Examiner — W B Perkey

(57) ABSTRACT

A mirrored photographing system is disclosed herein. In some embodiments, a mirrored photographing system comprises a back plate, a mirror, and a camera. The mirror is mounted to the back plate, which provides structural support. The mirror has a viewing aperture and a reflective surface covering at least a portion of the front surface of the mirror for self-viewing by a subject standing in front of the mirror. The camera is positioned between the back plate and the mirror and aligned with the viewing aperture for the camera to view the subject therethrough. The camera is configured for electronic wireless communication with a remote electronic device to at least one of (i) receive directions therefrom and (ii) to forward captured photographs thereto.

20 Claims, 6 Drawing Sheets

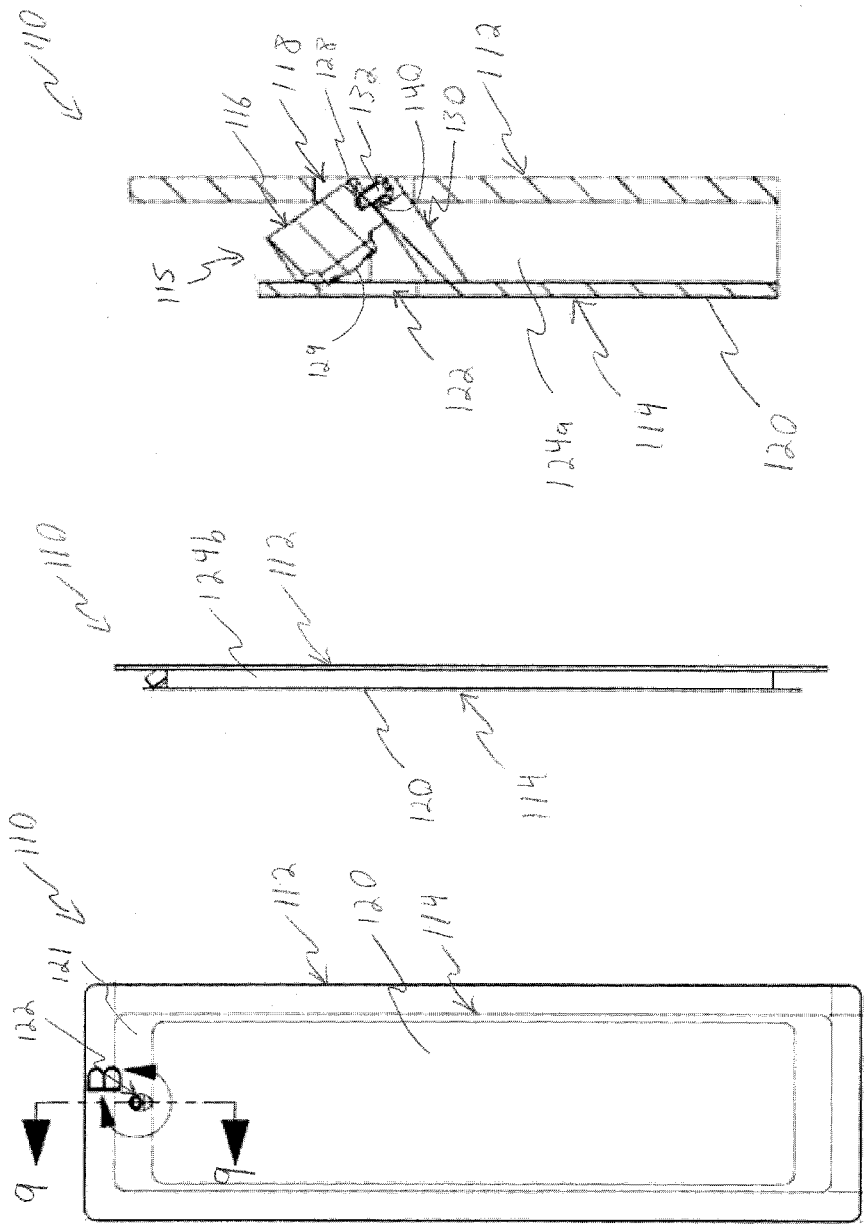

MIRRORED PHOTOGRAPHING SYSTEM

CROSS-REFERENCE TO RELATED APPLICATION

The present application claims the benefit of priority to U.S. provisional patent application No. 62/118,297, filed on Feb. 19, 2015, which is incorporated herein by reference in its entirety.

FIELD OF THE DISCLOSURE

Embodiments of the present disclosure relate to a mirrored photographing system and, more specifically, to a mirrored photographing system for hands free self-photography.

BACKGROUND

Self-photography (e.g., selfies) is growing in popularity, particularly among users of social networking websites. Many electronic handheld devices (e.g., smartphones, cameras, etc.) include features to facilitate self-photography. For example, some devices include an electronic display and front facing camera (e.g., as in many smartphones), so that a user can preview a picture before capture thereof. However, such self-photographed pictures are usually limited by the arm length of the user taking the photo, and as a result usually only include headshots of the user. If the distance between the device and the user is extended (e.g., using a tripod and timer, selfie stick, etc.), the display screen of the device is also extended and thereby previewing the photo becomes more difficult. Thus, a need exists for a hands free device that allows full body self-photographs which are easily pre-viewable. These and/or other needs are addressed by embodiments of the mirrored photographing system of the present disclosure.

SUMMARY

The present disclosure is directed to a mirrored photographing system. Disclosed herein is a mirrored photographing system comprises a back plate, a mirror, and a camera. The mirror is mounted to the back plate, which provides structural support. The mirror has a viewing aperture and a reflective surface covering at least a portion of the front surface of the mirror for self-viewing by a subject standing in front of the mirror. The camera is positioned between the back plate and the mirror and aligned with the viewing aperture for the camera to view the subject therethrough. The camera is configured for electronic wireless communication with a remote electronic device to at least one of (i) receive directions therefrom and (ii) to forward captured photographs thereto.

Also disclosed herein is a mirrored photographing system, comprising a stabilizing back plate, a reflective plate, and a remotely opera self-photographing camera system. The reflective plate is mounted to the stabilizing back plate. The reflective plate has a hole and a reflective surface for previewing a photograph prior to capturing thereof. The remotely operable self-photographing camera assembly is affixed to the stabilizing back plate and aligned with the reflective plate hole to remotely capture a self-portrait photograph.

BRIEF DESCRIPTION OF THE DRAWINGS

The foregoing features of the invention will be apparent from the following Detailed Description, taken in connection with the accompanying drawings, in which:

FIG. 7 is a front view of another embodiment of the mirrored photographing system of the present disclosure;

FIG. 8 is a side view of the mirrored photographing system of FIG. 7;

FIG. 9 is a sectional view taken along Line 9-9 of the mirrored photographing system of FIG. 7.

DETAILED DESCRIPTION

Disclosed herein is a mirrored photographing system (e.g., mirrored photographing unit, photographing mirrored unit, smart photographing mirror, smart mirror, etc.). The mirrored photographing system provides for hands free photographing of a subject(s) (e.g., person(s), user(s), etc.) positioned in front of a mirror (having a reflective surface) of the mirrored photographing system, by using a remotely operable front facing camera positioned behind the mirror (e.g., or above or adjacent to the mirror). In this way, the subject can view themselves from the perspective of the camera prior to taking a hands free picture. It allows for a user to capture self-portraits without holding a camera or the apparatus itself. This is particularly useful for easily pre-viewable full body hands-free self-photography.

Figure 1:
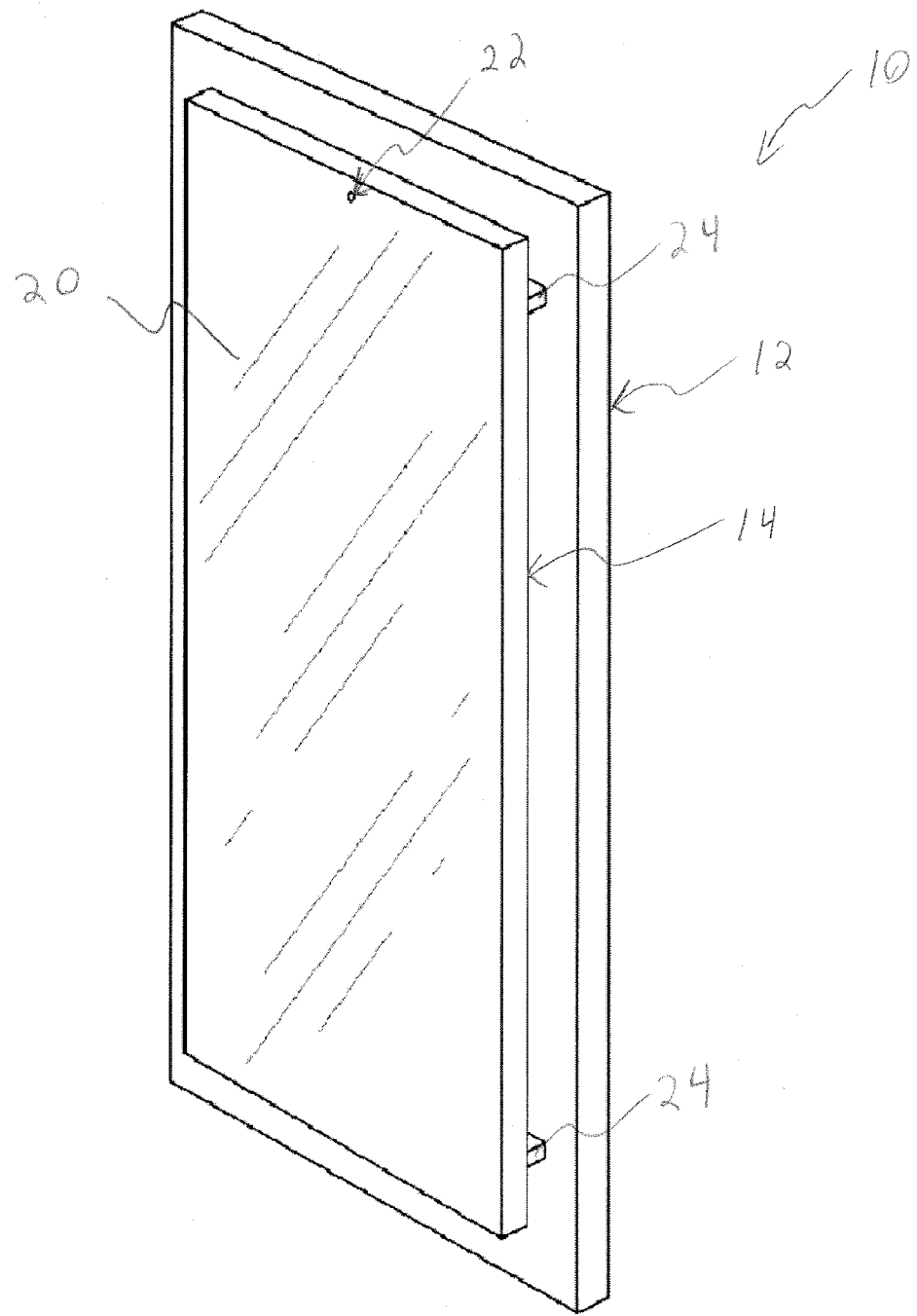
FIG. 1 is a perspective view of a mirrored photographing system of the present disclosure.
Figures 2, 3, 4:
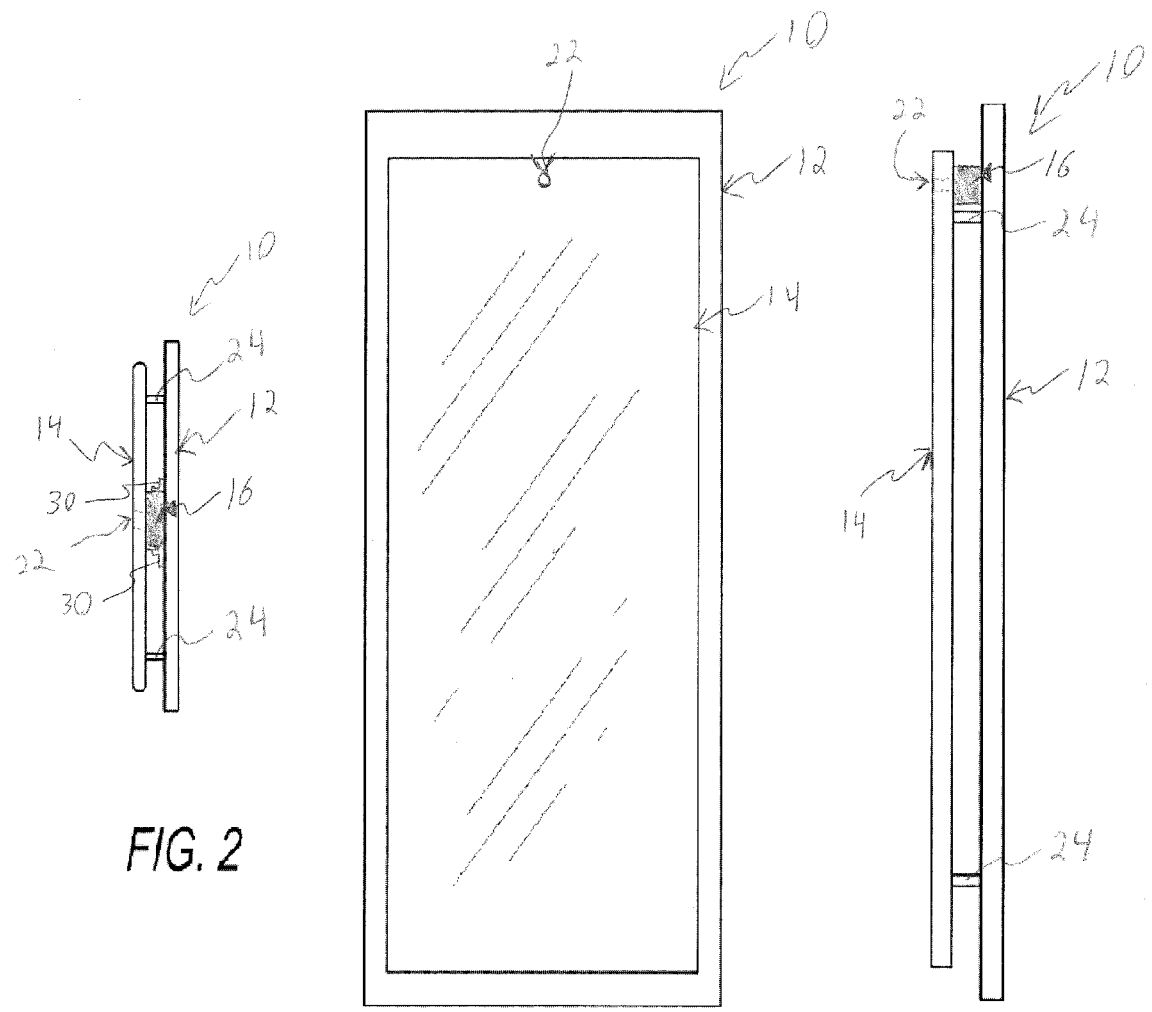
FIG. 2 is a top view of the mirrored photographing system of FIG. 1.
FIG. 3 is a front view of the mirrored photographing system of FIG. 1.
FIG. 4 is a side view of the mirrored photographing system of FIG. 1.

FIGS. 1-4 are views of a mirrored photographing system 10 of the present disclosure. More specifically, FIG. 1 is a perspective view of the mirrored photographing system 10, FIG. 2 is a top view of the mirrored photographing system 10 of FIG. 1, FIG. 3 is a front view of the mirrored photographing system 10 of FIG. 1, and FIG. 4 is a side view of the mirrored photographing system 10 of FIG. 1. The mirrored photographing system 10 comprises a back plate 12 (e.g., stabilizing plate), a mirror 14, and a camera 16 (e.g., camera module, camera assembly, etc.) therebetween.

The back plate 12 (e.g., stabilizing plate) provides structural support and could be of any size and shape (e.g., square, rectangular, oval, circular, etc.), and could be complementary in size and shape to that of the mirror 14. For example, as shown in FIGS. 1 and 3, the back plate 12 and the mirror 14 could both be rectangular with the back plate 12 slightly larger than the mirror 14 (thereby providing an aesthetic border to the mirror 14). Alternatively, the back plate 12 could be the same size and shape as the mirror 14, or the back plate 12 could even be smaller than the mirror 14 (e.g., such that the back plate 12 is not visible from the front of the mirror 14).

The mirror 14 (e.g., reflective plate) includes a reflective surface 20, a viewing aperture 22 (e.g., viewing hole, passageway, etc.), and support braces 24. The mirror could be glass, acrylic, or plastic, where an acrylic or plastic mirror is easier to drill and more durable (e.g., prevents shattering). The mirror 14 is shown as being full-length and of a rectangular shape, but the mirror 14 could be any of a variety of suitable types (e.g., floor mirror, table mirror, wall mirror, etc.), sizes (e.g., full-length mirror) and shapes (e.g., square, rectangular, oval, circular, etc.). At least a portion of the front of the mirror 14 includes the reflective surface 20 (e.g., reflective front surface) for a person to view themselves in the mirror 14, as shown in FIGS. 1 and 3. The reflective surface 20 could cover the entire front of the mirror 14, or only a portion thereof.

The viewing aperture 22 could be a through hole that extends from the mirror front surface to the mirror back surface, as shown in FIGS. 2 and 4. This provides the camera 16 with visibility of the subject (e.g., user) from behind the mirror 14 to view and capture the subject(s) in focus, as explained in more detail below. The viewing aperture 22 could be any of a variety of sizes and shapes (e.g., square, rectangular, oval, circular, etc.) depending on the size and positioning of the camera 16 (e.g., the lens of the camera 16). As shown in FIGS. 1 and 3, the viewing aperture 22 is located at the top of the mirror 14 (e.g., at the top of the reflective surface 20 of the mirror 14). Further, more than one viewing aperture 22 could be positioned in the mirror, such as to accommodate multiple cameras or a single camera with multiple positions (e.g., by use of a track).

The mirror 14 (e.g., mirrored plate) is mounted to the back plate 12 by the one or more supporting braces 24 (e.g., railing system), as shown in FIGS. 1-2 and 4. More specifically, for each supporting brace 24, a first side of the supporting brace 24 is attached to (e.g., contacting) a back surface of the mirror 14, and a second side of the supporting brace 24 is attached to (e.g., contacting) the front surface of the back plate 12 (e.g., the first side opposite the second side). In other words, the supporting braces 24 are positioned between the mirror 14 and the back plate 12 to attach them to one another. The mirror 14 could have contact portions adapted for connection to the support braces 24 (e.g., pre-fixed holes in the mirror 14 and/or support braces 24). In this way, the mirror 14 is offset from the back plate 12, thereby providing space for positioning of the camera 16 therebetween. Further, the supporting braces 24 could provide structural rigidity to the back plate 12 and/or mirror 14 (e.g., reducing flexibility in the mirror 14).

The supporting braces 24 could be of a variety of types (e.g., posts, strips, etc.), shapes, and sizes (e.g., thicknesses), and in a variety of positions. For example, the supporting braces 24 could be rigid (or semi-rigid) light-weight plastic. The supporting braces 24 could be hollow and have a plurality of walls (e.g., left, right, top, and bottom walls) defining an enclosed space (e.g., forming a 360 degree shape). The thickness of the supporting braces 24 could depend on the dimensions of the camera 16 because the thickness of the supporting braces 24 determine the offset distance of the back plate 12 from the mirror 14 which must be large enough to accommodate the camera 16. The supporting braces 24 could be positioned in (or towards) one or more corners of the mirror 14 (e.g., resulting in four supporting braces 24 in each of the four corners of the mirror 14), as shown in FIGS. 1-2 and 4. For example, the mirror 14 could use cylinder screw-in locks (e.g., visible from the front of the mirror 14) in the top and bottom corners of the mirror 14 to lock the mirror 14 to the back plate 12. Alternatively, supporting braces 24 could be positioned along (or towards) one or more edges of the mirror 14 (e.g., resulting in four supporting braces 24 along each of the four edges of the mirror 14). Spacing (e.g., gaps) could be provided between the supporting braces 24 so that the interior space formed between the back plate 12 and the mirror 14 is not entirely enclosed. This could allow for electrical mating between the camera 16 and a power unit (e.g., battery, electrical outlet, etc.) for charging and powering the camera 16.

The camera 16 (e.g., camera module, camera assembly, etc.) is positioned between the back plate 12 and the mirror 14, behind the mirror viewing aperture 22. The camera 16 could be a picture camera and/or a video camera such that the camera 16 could take photos and/or videos. The camera 16 could include a battery power supply and/or remote control electronics and provide high resolution image production.

The camera 16 is positioned and oriented so as to view the subject in front the mirror 14 through the viewing aperture 22, and in this way to take a photograph of the subject. In other words, the camera 16 is forward facing (e.g., facing the front of the mirrored photographing system 10). The camera 16 could be mounted to the back plate 12 by one or more mounting braces 30, or any other mounting device or fastener (e.g., tape, screws, etc.). Alternatively, the camera 16 could be mounted to the back surface of the mirror 14, or could be mounted at another location (e.g., above, below, or adjacent to the mirror 14). The camera 16 could include contact portions (e.g., threaded hole) for attaching the camera 16 to the back plate 12 and/or mirror 14. The camera 16 could include a protective housing for the camera 16, which could be a specially adapted mounted enclosure for releasably securing the camera 16 (and the protective housing) to the back plate 12 (and/or mirror 14).

The camera 16 could include a lens (e.g., single needle-point lens) flexibly coupled thereto (e.g., by a wire connection), where the lens could be mounted (e.g., affixed) to the back surface of the mirror 14 and/or into the viewing aperture 22 (e.g., pre-inserted hole, hollow cylinder, etc.), allowing for visibility to the frontside of the mirror 14 (and enclosing the wired lens) and holding the camera 16 in the proper position.

It is noted that the mirrored photographing system 10 does not require the backplate 12 or even the mirror supporting braces 24. For example, the mirror 14 could be a standing mirror (e.g., self-standing mirror), such as an independently upright mirror rotatably or fixedly mounted to a stand. Alternatively, the camera 16 could be mounted to the back surface of the mirror 14, and/or the mirror 14 could be mounted to a wall by the mirror supporting braces 24 (e.g., creating a space between the mirror 14 and the wall for the camera 16).

Figure 5:
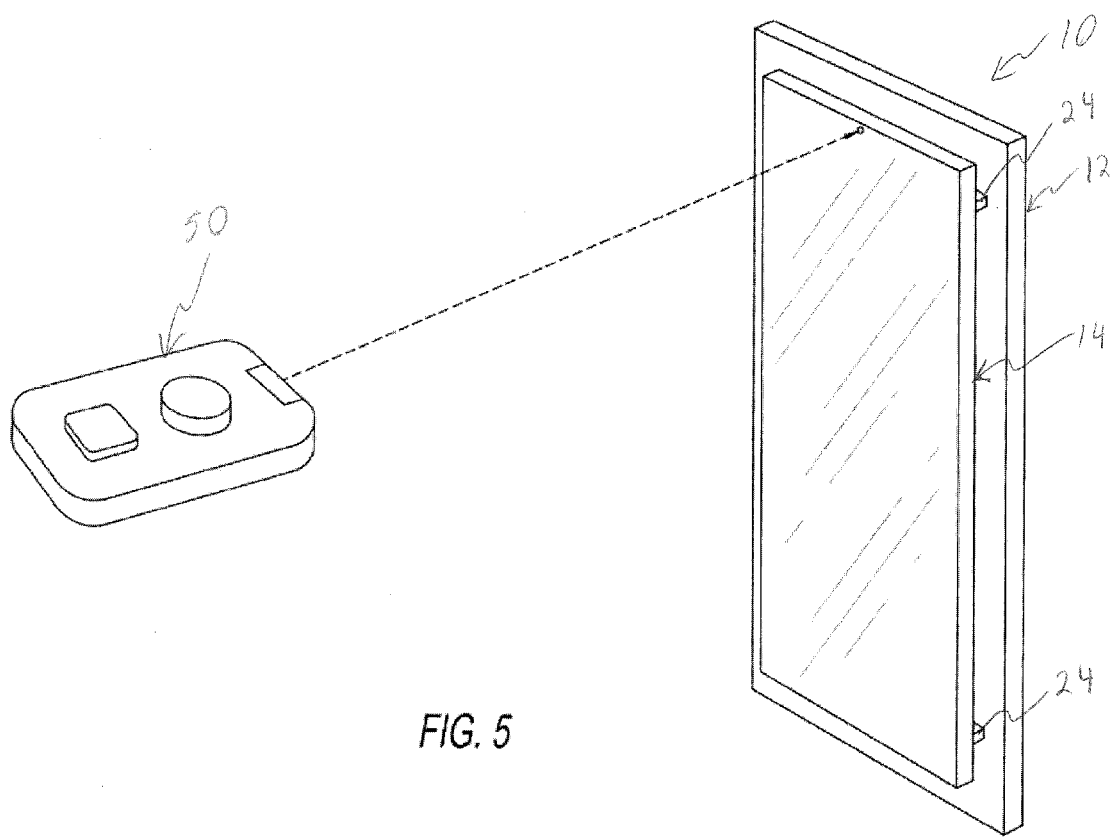
FIG. 5 is a perspective view illustrating remote pairing of an electronic device with the mirrored photographing system of FIG. 1.

FIG. 5 is a perspective view illustrating remote pairing of an electronic device 50 with the mirrored photographing system 10 of FIG. 1. More specifically, the camera 16 could be wirelessly connected (e.g., via Bluetooth) with a remote electronic device 50 (e.g., mobile device, handheld device, remote, remote control, etc.), such as a smartphone, smartwatch, or other mobile or wearable electronic device. This allows a user to remotely control the camera 16 and/or capture photos from their electronic device 50 (e.g., using mobile based software). The electronic device 50 could be used by the user to take a picture with the camera 16, and then the electronic device 50 could (immediately or in batches) wirelessly receive photos from the camera 16 for review on a display screen of the electronic device 50. The electronic device 50 could be used to reposition the camera 16 (e.g., using servos and other motors), and/or the electronic device 50 could indicate which of a plurality of cameras to take the picture (or direct all of a plurality of cameras to take the picture). The mirrored photographing system 10 (particularly the camera 16) is operable by way of remote based software, which could be used to enhance photograph efficiency and display a high resolution image (e.g., a portrait) of the subject (e.g., user) of the photograph and/or assistant (e.g., another user assisting in capturing a photograph of the subject). Additionally or alternatively, the electronic device 50 could be used to set up one or more functions of the camera 16 (e.g., timer, rate of capture, duration of capture, etc.). For example, the electronic device 50 could (wirelessly) set up the camera 16 (or the camera 16 could be set up directly) to take a picture every 5 seconds for 20 seconds.

Further, the electronic device 50 could automatically detect (e.g., wirelessly via Bluetooth) when a mirrored photographing system 10 is within range, and prompt or invite a user to use the mirrored photographing system 10, such as via a display of the electronic device 50 or in communication therewith (e.g., a computer display, a television display, etc.). This could be particularly advantageous in stores or other locations to encourage a user to browse, try on, and/or purchase particular items, and/or for entertainment purposes.

The electronic device 50 could include software for photograph enhancement, photograph editing, video, video editing, internet integration (e.g., on social networking websites), etc. The electronic device 50 (and/or camera 16) could also change the background (e.g., automatically or by user selection) of the subject once executed (e.g., post editing). Photos taken by the camera 16, through either the camera 16 and/or the electronic device 50, could be automatically or manually uploaded to a social networking website to share the photos publicly or privately with family, friends, a community, and/or the public. The website could also allow website members to like and/or comment on such photos.

Figure 6:
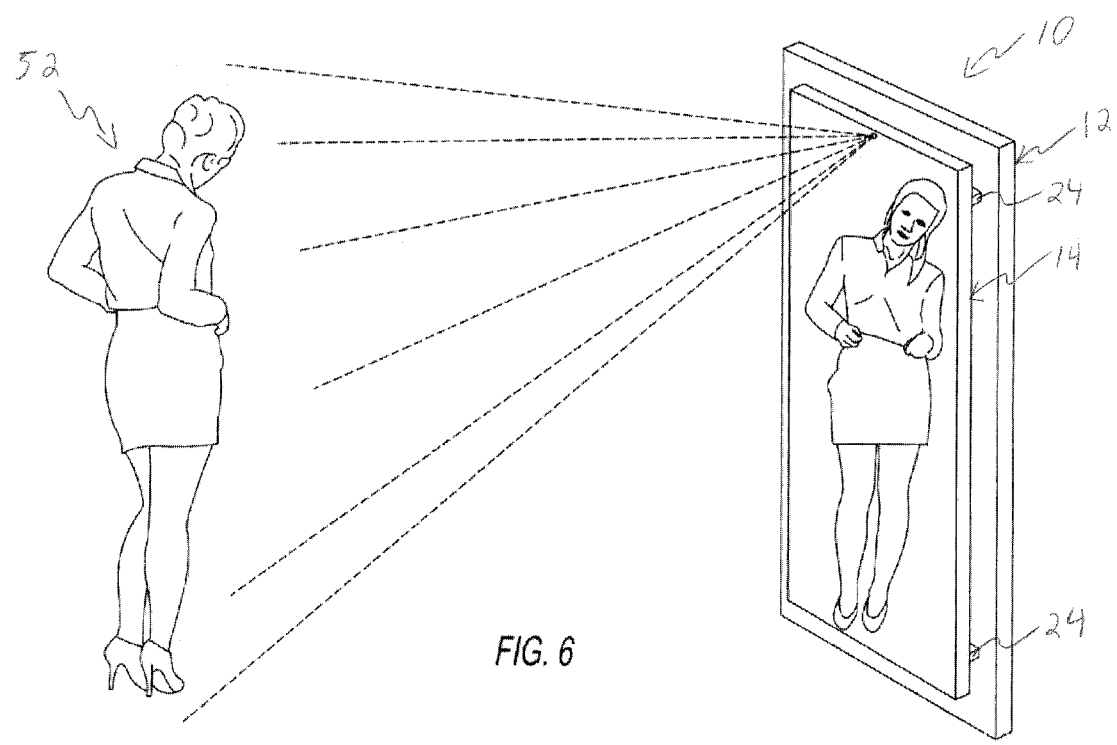
FIG. 6 is a perspective view of a subject using the mirrored photographing system of FIG. 1.

FIG. 6 is a perspective view of a subject using the mirrored photographing system of FIG. 1. As shown, the mirror 14 (e.g., the mirror reflective surface 20) provides for simultaneous viewing by the subject 52 and the camera 16 prior to taking (e.g., capturing) a photograph of the subject 52 (e.g., the image being reflected by the mirror 14). The subject 52 can control his or her proximity to the mirrored photographing system 10 (e.g., by walking closer or further away from the mirrored photographing system 10), while controlling photographing (and/or video recording) functions of the camera 16. For example, the subject 52 could use an electronic device (e.g., smartphone, remote, etc.) to remotely capturing his or her own photograph, or could use the electronic device to set up the camera 16 to take a picture every 10 seconds for 60 seconds. The subject 52 is thereby not restrained to holding an electronic device to capture a self-portrait, nor is a user limited by the length of his or her limbs. Further, the subject 52 has full freedom of movement, the ability to pose in any desired manner, and the ability to preview (e.g., prescreen) the photograph from beyond arms-length. The subject 52 is unrestricted by the need to hold the camera (or other electronic device) to orient, preview, and take a photograph. The subject 52 can use a natural mirror viewing to preview the photograph prior to and/or simultaneous with the image being captured. Thus, the mirrored photographing system enhances the experience of capturing self-portraits (e.g., by the subject 52 and/or a third party).

Figure 10:
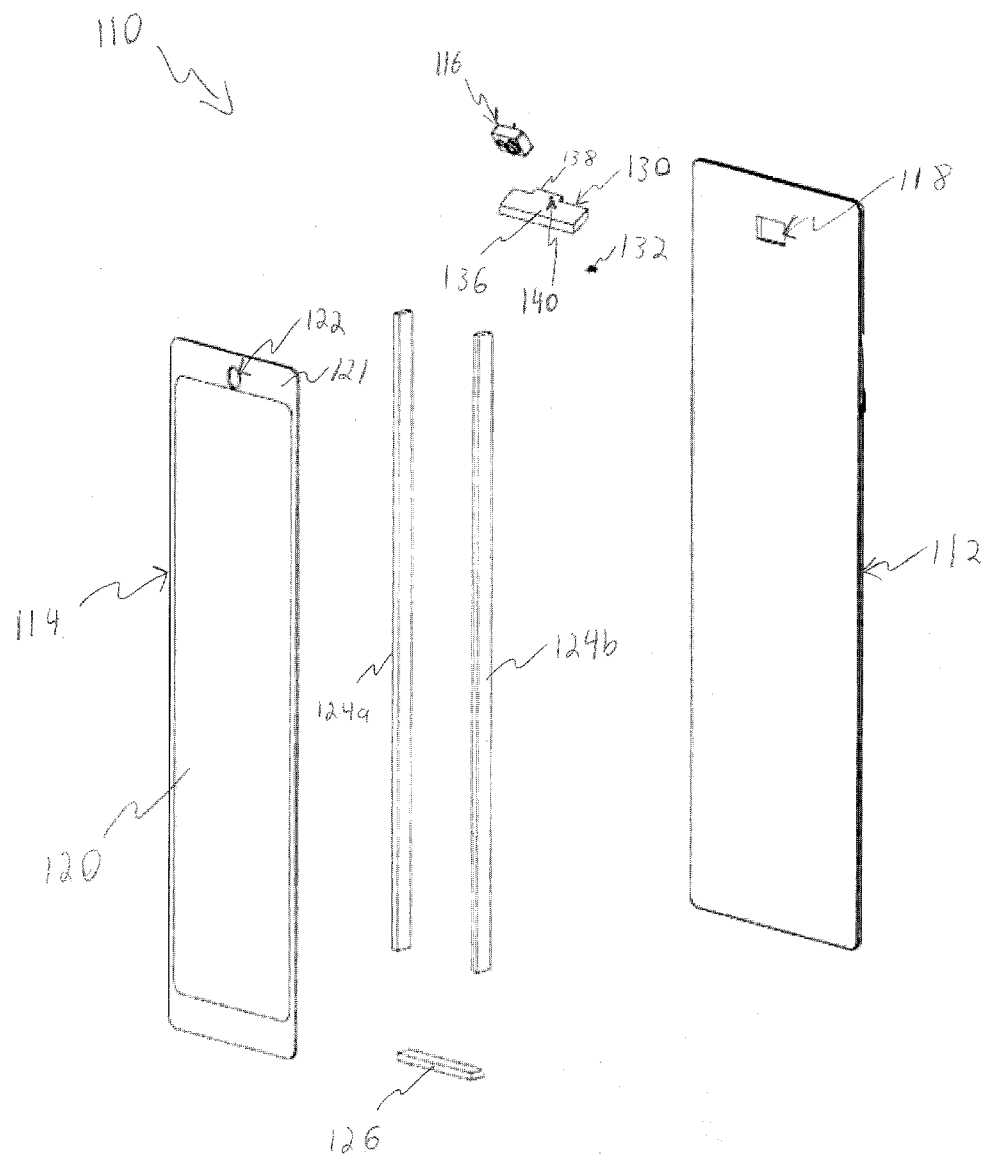
FIG. 10 is an exploded perspective view of the mirrored photographing system of FIG. 7.

FIGS. 7-10 are views of another embodiment of the mirrored photographing system of the present disclosure. More specifically, FIG. 7 is a front view of another embodiment of the mirrored photographing system 110, FIG. 8 is a side view of the mirrored photographing system 110 of FIG. 7, FIG. 9 is a sectional view taken along Line 9-9 of the mirrored photographing system 110 of FIG. 7, and FIG. 10 is an exploded perspective view of the mirrored photographing system 110 of FIG. 7. The mirrored photographing system 110 includes many of the same components and configurations described above with respect to FIGS. 1-6. The mirrored photographing system includes a back plate (e.g., stabilizing plate) 112, a mirror 114, and a camera assembly 115.

As shown in FIGS. 9-10, the back plate 112 includes a mounting aperture 118, which is used to mount and position the camera 116, as explained in more detail below. The mounting aperture 118 extends from a front surface to a back surface of the mounting aperture 118. The mounting aperture 118 could be any of a variety of sizes and shapes depending on the needs and requirements of mounting and positioning the camera 116.

As shown in FIG. 7, the mirror 114 includes a reflective surface 120 which covers less than the entire front surface of the mirror 114, such that there is a non-reflective border 121 surrounding the reflective surface 120 (e.g., a non-reflective border at each of the four sides of the rectangular reflective surface 120). The mirror 114 includes a viewing aperture 122 (as discussed above) positioned at a top of the mirror 114 within the non-reflective border 121.

The mirror 114 is mounted to the back plate 112 by supporting braces (e.g., support strips), shown in FIGS. 8 and 10. More specifically, the mirror 114 includes a left support brace 124a attached to a back surface of the mirror 114 proximate a left edge thereof, a right support brace 124b attached to the back surface of the mirror 114 proximate a right edge thereof, and a bottom support brace 126 attached to the back surface of the mirror 114 proximate a bottom edge thereof.

As shown in FIGS. 9-10, the camera assembly 115 includes a camera 116, mounting brace 130, and fastener 132. The camera 116 includes an engagement hole 128 (e.g., threaded) in a bottom surface thereof and a lens 129 in a front surface thereof. The mounting brace 130 has a generally rectangular body component 136, with a generally rectangular mounting protrusion 138 extending from a back surface of the body component 136. The mounting protrusion 138 has a narrower width than the body component 136. The width of the mounting protrusion 138 is approximate in size and shape to that of the back plate mounting aperture 118 (for insertion therein). The depth of the body component 136 corresponds to the space between the back plate 112 and the mirror 114 (e.g., distance between the front surface of the back plate 112 and the back surface of the mirror 114). The depth of the mounting protrusion 138 corresponds to the thickness of the back plate 112. The mounting brace 130 further includes an attachment hole 140 (e.g., counter bore hole) extending from a top surface of the mounting brace 130 through a bottom surface of the mounting brace 130. The attachment hole 140 could be positioned in the mounting protrusion 138 or proximate thereto, but the positioning could correspond to the positioning of the camera engagement hole 128.

Accordingly, when the camera engagement hole 128 is aligned with the mounting brace attachment hole 140, the fastener 132 (e.g., screw) could be inserted (from the bottom surface of the mounting brace 130) through the mounting brace attachment hole 140 and into the camera engagement hole 128, thereby securing the camera 116 to the mounting brace 130. The camera 116 is attached to the mounting brace 130 such that the camera lens 129 is facing towards the mounting brace body component 136.

As shown in FIG. 9, the camera assembly 115 is positioned between the mirror 114 and the back plate 112 and, more specifically, between the mirror viewing aperture 122 and the back plate mounting aperture 118. The mounting brace mounting protrusion 138 is inserted into the back plate mounting aperture 118. When at rest in this position, the camera assembly 115 rotates forward into the back surface of the mirror 114, until a front and/or top edge of the camera 116 contacts the back surface of the mirror 114. The mounting brace body component 136 prevents the camera 116 and mounting brace 130 from slipping out of the back plate mounting aperture 118 (e.g., by rotating the bottom surface of the mounting brace 130 clockwise until the mounting brace mounting protrusion 138 disengages from the back plate mounting aperture 118). Accordingly, the camera assembly 115 is wedged between the back plate 112 and mirror 114, with the camera lens 129 aligned with the mirror viewing aperture 22 and angled generally downwardly.

The present disclosure includes multiple embodiments. For example, some embodiments of the disclosure pertain to a reflective plate and surface with an attached camera system, affixed to a stabilizing back plate creating a flotation effect, the camera system is remotely operable. More particularly, some embodiments are operable by way of remote based software used to enhance photograph efficiency and display a high resolution image of a portrait to either the subject of the photograph who is also the user, or one assisting in capturing a photograph of a subject. The embodiments are not limited to a wall mount, but may stand upright independently, some embodiments allow for one to capture self-portraits without holding the camera or apparatus.

In some embodiments, the general object is to enhance the experience of one capturing a self-portrait, where the subject or third party aims to capture their own photograph. In some embodiments, while being able to control proximity to the apparatus (e.g., mirrored photographing unit), the subject is able to remotely capture their own photograph by way of remote software. In some embodiments, granting the user the ability to remotely integrate the camera system, the user is not restrained to holding the device, thus allowing the user the freedom of proximity to the apparatus, and number of participants or subjects at any given point.

In some embodiments, another object is to provide a self-photographing apparatus which allows for freedom of movement, and the ability for the subject to pose in their desired manner, unrestricted by the need to hold with one's hand(s) the device being utilized to capture the photograph.

In some embodiments, still another object is to provide a user the ability to view and prescreen the photograph from beyond arms-length. In some embodiments, by providing the user a natural mirrored viewing of the subject, the apparatus provides the user with the photographable image prior and simultaneous to the image being captured.

In some embodiments, still a further object is to provide a user remote controllability via mobile based software which allows the user to remotely capture the photograph, and subsequently following the image being captured provides user a visual of the photograph. In some embodiments. as a remote application to the camera system, the application allows for photograph enhancement, photograph editing, video, video editing, and internet integration.

In some embodiments, these and other objects are accomplished by a self-photographing camera system embedded into a reflective, mirror-like plate mounted to a back stabilizing plate. Some embodiments comprise a miniature imaging camera assembly, a protective housing for the camera assembly and a specially adapted mounted enclosure assembly for releasably stationing the camera assembly and its protective housing in a central position on the stabilizing plate. In some embodiments, the camera assembly further includes and integrates a miniaturized camera unit with associated battery power supply and remote control electronics for high resolution image production. In some embodiments, a single needlepoint lens is flexibly coupled to the camera assembly and its housing by means of wire connection. In some embodiments, the lens is mounted to the backside of the reflective plate into a pre inserted hole, allowing for visibility to the frontside of the plate. In some embodiments, the lens is affixed to the backside of the reflective plate by way of a hollow cylinder enclosing the wired lens, holding the unit in proper position to the backside of the reflective plate. In some embodiments, cylinder screw-in locks, visible on the frontside of the invention, are located on the top and bottom corners of the mirrored plate, and serve to lock the mirrored plate to the stabilizing plate in its designed position.

Having thus described the invention in detail, it is to be understood that the foregoing description is not intended to limit the spirit or scope thereof. It will be understood that the embodiments of the present invention described herein are merely exemplary and that a person skilled in the art may make many variations and modification without departing from the spirit and scope of the invention. All such variations and modifications, including those discussed above, are intended to be included within the scope of the invention.

The invention claimed is:

1. A mirrored photographing system, comprising:
    a back plate for structural support;
    a mirror mounted to the back plate, the mirror having a viewing aperture and a reflective surface covering at least a portion of the front surface of the mirror for self-viewing by a subject standing in front of the mirror; and
    a camera positioned between the back plate and the mirror and aligned with the viewing aperture for the camera to view the subject therethrough, the camera configured for electronic wireless communication with a remote electronic device to at least one of (i) receive directions therefrom and (ii) to forward captured photographs thereto.

2. The mirrored photographing system of claim 1, wherein the mirror is a full-length mirror.

3. The mirrored photographing system of claim 1, wherein the viewing aperture is positioned at a top of the mirror.

4. The mirrored photographing system of claim 1, comprising at least one supporting brace mounting the mirror to the back plate.

5. The mirrored photographing system of claim 4, wherein the mirror comprises at least four corners, and the at least one supporting brace is positioned in each of four corners of the mirror.

6. The mirrored photographing system of claim 1, wherein the camera is configured to capture pictures and video.

7. The mirrored photographing system of claim 1, comprising a mounting brace mounting the camera to the back plate.

8. The mirrored photographing system of claim 7, wherein the mounting brace comprises a body component and a mounting protrusion extending from a back surface of the body component, the mounting brace including an attachment hole for attachment of the camera thereto.

9. The mirrored photographing system of claim 8, wherein the back plate comprises a mounting aperture to receive at least a portion of the mounting protrusion of the mounting brace to position and secure the camera between the back plate and the mirror.

10. The mirrored photographing system of claim 1, further comprising the remote electronic device.

11. The mirrored photographing system of claim 10, wherein the remote electronic device is configured to electronically receive captured photographs from the camera.

12. The mirrored photographing system of claim 11, wherein the remote electronic device is configured to electronically direct the camera to take a photograph.

13. A mirrored photographing system, comprising:
    a stabilizing back plate;
    a reflective plate mounted to the stabilizing back plate, the reflective plate having a hole and a reflective surface for previewing a photograph prior to capturing thereof; and a remotely operable self-photographing camera assembly affixed to the stabilizing back plate and aligned with the reflective plate hole to remotely capture a self-portrait photograph.

14. The mirrored photographing system of claim 13, wherein the camera assembly wirelessly transmits the captured photograph to an electronic device for a user to view the captured photograph on a display screen of the electronic device.

15. The mirrored photographing system of claim 13, wherein the camera assembly comprises a protective housing for releasably stationing the camera in the protective housing.

16. The mirrored photographing system of claim 13, wherein a lens of the camera assembly is mounted in the hole of the reflective plate.

17. A method of using a mirrored photographing system, comprising:
   providing a mirrored photographing system having a back plate for structural support, a mirror mounted to the back plate, the mirror having a viewing aperture and a reflective surface covering at least a portion of the front surface of the mirror for self-viewing by a subject standing in front of the mirror, and a camera positioned between the back plate and the mirror and aligned with the viewing aperture for the camera to view the subject therethrough, the camera configured for electronic wireless communication with a remote electronic device;
   reflecting, by the mirror, an image of a user to the user;
   electronically receiving, by the camera, directions from the remote electronic device operated by the user;
   capturing, by the camera, a photograph of the user as electronically directed by the remote electronic device operated by the user; and
   electronically forwarding, by the camera, the captured photograph to the remote electronic device.

18. The method of claim 17, further comprising electronically pairing the remote electronic device with the camera for electronic communication between the remote electronic device and the camera.

19. The method of claim 17, wherein the mirror is a full-length mirror.

20. The method of claim 17, wherein the mirrored photographing system further comprises the remote electronic device.

* * * * *